US011243511B2

United States Patent
Jia et al.

(10) Patent No.: US 11,243,511 B2
(45) Date of Patent: Feb. 8, 2022

(54) LOAD-ENERGY EFFICIENCY EVALUATION AND MONITORING METHOD FOR ACHIEVING ENERGY CONSERVATION AND EMISSION REDUCTION OF NUMERICAL CONTROL MACHINE TOOL

(71) Applicant: SHANDONG UNIVERSITY OF SCIENCE AND TECHNOLOGY, Qingdao (CN)

(72) Inventors: Shun Jia, Qingdao (CN); Yujie Zheng, Qingdao (CN); Chao Liu, Qingdao (CN); Qinghe Yuan, Qingdao (CN); Zhiqiang Wang, Qingdao (CN); Xiaoyuan Ma, Qingdao (CN); Li Zhang, Qingdao (CN); Haiyang Wang, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 17/260,744

(22) PCT Filed: Apr. 29, 2019

(86) PCT No.: PCT/CN2019/084939
§ 371 (c)(1),
(2) Date: Jan. 15, 2021

(87) PCT Pub. No.: WO2020/093666
PCT Pub. Date: May 14, 2020

(65) Prior Publication Data
US 2021/0247740 A1   Aug. 12, 2021

(30) Foreign Application Priority Data
Nov. 5, 2018 (CN) .......................... 201811305123.0

(51) Int. Cl.
*G05B 19/4155* (2006.01)
*G06K 7/10* (2006.01)

(52) U.S. Cl.
CPC ..... *G05B 19/4155* (2013.01); *G06K 7/10366* (2013.01); *G05B 2219/32021* (2013.01)

(58) Field of Classification Search
CPC ........................................... G05B 2219/32021
(Continued)

(56) References Cited

U.S. PATENT DOCUMENTS

2020/0301408 A1 * 9/2020 Elbsat ................ G05B 23/0291

FOREIGN PATENT DOCUMENTS

CN       109491323 A       3/2019

OTHER PUBLICATIONS

Werner, "An Early Warning Monitoring System for CNC Spindle Bearing Failure" Master of Science Thesis, Clemson University, 2011, 227 pgs. (Year: 2011).*

(Continued)

*Primary Examiner* — Emilio J Saavedra
(74) *Attorney, Agent, or Firm* — Hauptman Ham, LLP

(57) ABSTRACT

A load-energy efficiency evaluation and monitoring method includes an actual part processing number and a theoretical part processing number of the numerical control machine tool within an evaluation period are obtained to calculate a loading performance of the numerical control machine tool. A waste time value and a standby power value of the numerical control machine tool are obtained to calculate a waste energy value of the numerical control machine tool. A single-part actual processing energy consumption is obtained and used, together with a single-part ideal processing energy consumption, to calculate the load-energy efficiency of the numerical control machine tool. A relationship model between the load-energy efficiency and the loading (Continued)

performance of the numerical control machine tool is built based on the obtained model of the load-energy efficiency of the numerical control machine tool and the obtained model of the loading performance of the numerical control machine tool.

4 Claims, 1 Drawing Sheet

(58) Field of Classification Search
USPC .......................................................... 700/28
See application file for complete search history.

(56) References Cited

OTHER PUBLICATIONS

Zhou et al., "Energy consumption model and energy efficiency of machine tools: a comprehensive literature review" Journal of Cleaner Production vol. 112 (2016) pp. 3721-3734 (Year: 2016).*

Zhao et al., "Energy consumption characteristics evaluation method in turning" Advances in Mechanical Engineering 2016, vol. 8(11) pp. 1-8 (Year: 2016).*

Corcoran, "Energy Analysis of Manufacturing Equipment in a Production Setting" Master of Science Thesis, Wichita State University, 2010, 88 pgs. (Year: 2010).*

International Search Report issued in corresponding International Application No. PCT/CN2019/084939; dated Aug. 7, 2019; State Intellectual Property Office of the P.R. China, Beijing, China, 7 pgs.

Written Opinion issued in corresponding International Application No. PCT/CN2019/084939; dated Aug. 7, 2019; State Intellectual Property Office of the P.R. China, Beijing, China, 8 pgs.

First Search Report issued in corresponding Chinese Application No. 2018113051230; dated Aug. 28, 2020; State Intellectual Property Office of the P.R. China, Beijing, China, 4 pgs.

Zhao et al., "An Online Monitoring Approach for Energy Efficiency of Machine Tools Based on Characteristics of Additional Load Loss", Machine Tool & Hydraulics, Sep. 2013, vol. 41, No. 17, pp. 60-65.

Yan et al., "Method for Modeling the Dynamic Energy Characteristics of Multi-energy Sources in CNC Machine Tool", Journal of Mechanical Engineering, Jun. 2015, vol. 51, No. 11, pp. 123-132.

First Office Action issued in corresponding Chinese Application No. 2018113051230; dated Sep. 9, 2020; State Intellectual Property Office of the P.R. China, Beijing, China, 7 pgs.

Second Office Action issued in corresponding Chinese Application No. 2018113051230; dated Oct. 19, 2020; State Intellectual Property Office of the P.R. China, Beijing, China, 7 pgs.

Notification to Grant issued in corresponding Chinese Application No. 2018113051230; dated Nov. 18, 2020; State Intellectual Property Office of the P.R. China, Beijing, China, 4 pgs.

* cited by examiner

LOAD-ENERGY EFFICIENCY EVALUATION AND MONITORING METHOD FOR ACHIEVING ENERGY CONSERVATION AND EMISSION REDUCTION OF NUMERICAL CONTROL MACHINE TOOL

RELATED APPLICATIONS

The present application is a U.S. National Phase of International Application Number PCT/CN2019/084939, filed Apr. 29, 2019, and claims the priority of Chinese Application No. 201811305123.0, filed Nov. 5, 2018.

TECHNICAL FIELD

The present disclosure relates to the field of evaluation and improvement of energy efficiency of numerical control machine tools in the manufacturing industry, and in particular to a load-energy efficiency evaluation and monitoring method for achieving energy conservation and emission reduction of a numerical control machine tool.

BACKGROUND

A numerical control machine tool, as a "working mother machine" in the industry, is critical equipment widely used in the manufacturing industry. Evaluation and improvement of the energy efficiency of the numerical control machine tool play a very important role in energy conservation and emission reduction of the manufacturing industry. Thus, the study of a load-energy efficiency evaluation and monitoring method of a numerical control machine tool is of great significance to the improvement of the energy efficiency of the numerical control machine tool in the manufacturing industry.

A loading performance of the numerical control machine tool is subjected to an actual part processing number and a theoretical part processing number of the numerical control machine tool; and the load-energy efficiency of the numerical control machine tool is subjected to a single-part ideal processing energy consumption and a single-part actual processing energy consumption. Further, a relationship model between the load-energy efficiency of the numerical control machine tool and the loading performance of the numerical control machine tool may be built. At present, there is still no effective evaluation model and method fully considering the impact of the loading performance of the numerical control machine tool on the energy efficiency of the numerical control machine tool. In the method of the present disclosure, a relationship model between the load-energy efficiency of the numerical control machine tool and the loading performance of the numerical control machine tool is built in comprehensive consideration of the impact of the loading performance of the numerical control machine tool on the energy efficiency of the numerical control machine tool. Further, the load-energy efficiency of the numerical control machine tool is monitored to realize over-limit alarming of the load-energy efficiency of the numerical control machine tool. In consideration of the impact of a rate loss of the numerical control machine tool on the energy efficiency of the numerical control machine tool, the method of the present disclosure can effectively and accurately evaluate the load-energy efficiency of the numerical control machine tool in the manufacturing industry and realize the over-limit alarming for the load-energy efficiency of the numerical control machine tool. Therefore, the method is an effective and practical method of evaluating and monitoring the energy efficiency.

SUMMARY

The object of the present disclosure is to provide a load-energy efficiency evaluation and monitoring method of a numerical control machine tool in the manufacturing industry, and compare the obtained load-energy efficiency of the numerical control machine tool with a preset alarming lower limit value of the load-energy efficiency of the numerical control machine tool, so as to realize the over-limit alarming of the load-energy efficiency of the numerical control machine tool and control the load-energy efficiency of the numerical control machine tool to be always within a required range, thereby ensuring high-efficiency and energy-saving operation of the numerical control machine tool.

The load-energy efficiency evaluation and monitoring method for achieving energy conservation and emission reduction of a numerical control machine tool includes the following steps.

At step 1, after each part provided with a radio frequency identification (RFID) tag is processed, an RFID reader automatically perceives the processed part and automatically increases the part number by 1 so as to obtain the actual part processing number, denoted as $O_{actual}$, of the numerical control machine tool within a given time period.

At step 2, the theoretical part processing number of the numerical control machine tool is calculated according to an available time of the numerical control machine tool within the given time period and a single-part ideal processing time based on the following calculation model:

$$O_{theory} = \frac{T_{available}}{T_{ideal-CT}}.$$

In the above model, $O_{theory}$ refers to the theoretical part processing number of the numerical control machine tool within the given time period, $T_{available}$ refers to the available time of the numerical control machine tool within the given time period, and $T_{ideal-CT}$ refers to the single-part ideal processing time.

At step 3, a loading performance of the numerical control machine tool is calculated based on the obtained actual part processing number of the numerical control machine tool and the obtained theoretical part processing number of the numerical control machine tool within the given time period. The calculation model for this calculation is as follows:

$$\eta_{performance} = \frac{O_{actual}}{O_{theory}}.$$

In the above model, $\eta_{performance}$ refers to the loading performance of the numerical control machine tool, $O_{actual}$ refers to the actual part processing number of the numerical control machine tool within the given time period, and $O_{theory}$ refers to the theoretical part processing number of the numerical control machine tool within the given time period.

At step 4, an energy consumption measuring device is installed at an air switch of the numerical control machine tool to measure a single-part processing energy consumption value several times under given ideal processing parameters and perform averaging for the obtained energy consumption values so as to obtain a single-part ideal processing energy consumption value, denoted as $E_{ideal}$.

At step 5, a waste energy value of the numerical control machine tool within the given time period is calculated based on a waste time of the numerical control machine tool within the given time period and a standby power value of the numerical control machine tool. The calculation model for this calculation is as follows:

$$E_{waste} = T_{waste} \times P_{standby}.$$

In the above model, $E_{waste}$ refers to the waste energy value of the numerical control machine tool within the given time period, $T_{waste}$ refers to the waste time of the numerical control machine tool within the given time period, and $P_{standby}$ refers to the standby power value of the numerical control machine tool.

At step 6, a single-part actual processing energy consumption value is obtained according to the obtained waste energy value of the numerical control machine tool within the given time period in combination with the actual part processing number of the numerical control machine tool within the given time period. The calculation formula for this calculation is as follows:

$$E_{actual} = \frac{O_{actual} \times E_{ideal} + E_{waste}}{O_{actual}}.$$

In the above formula, $E_{actual}$ refers to the single-part actual processing energy consumption value, $O_{actual}$ refers to the actual part processing number of the numerical control machine tool within the given time period, $E_{ideal}$ refers to the single-part ideal processing energy consumption value, and $E_{waste}$ refers to the waste energy value of the numerical control machine tool within the given time period.

At step 7, the load-energy efficiency of the numerical control machine tool is calculated based on the obtained single-part ideal processing energy consumption value and the obtained single-part actual processing energy consumption value. The calculation model for this calculation is as follows:

$$\eta_{performance\_e} = \frac{E_{ideal}}{E_{actual}}.$$

In the above model $\eta_{performance\_e}$ refers to the load-energy efficiency of the numerical control machine tool, $E_{ideal}$ refers to the single-part ideal processing energy consumption value, and $E_{actual}$ refers to the single-part actual processing energy consumption value.

At step 8, a relationship model between the load-energy efficiency of the numerical control machine tool and the loading performance of the numerical control machine tool is obtained through derivation operation according to the obtained calculation model of the loading performance of the numerical control machine tool and the obtained calculation model of the load-energy efficiency of the numerical control machine tool. The relationship model is expressed by the following formula:

$$\eta_{performance\_e} = \frac{O_{actual} \times E_{ideal} \times T_{available}^{-1}}{O_{actual} \times E_{ideal} \times T_{available}^{-1} + (1 - \eta_{performance}) \times P_{standby}}.$$

In the above formula, $\eta_{performance\_e}$ refers to the load-energy efficiency of the numerical control machine tool, $O_{actual}$ refers to the actual part processing number of the numerical control machine tool within the given time period, $E_{ideal}$ refers to the single-part ideal processing energy consumption value, $T_{available}$ refers to the available time of the numerical control machine tool within the given time period, $\eta_{performance}$ refers to the loading performance of the numerical control machine tool, and $P_{standby}$ refers to the standby power value of the numerical control machine tool.

At step 9, the obtained load-energy efficiency $\eta_{performance\_e}$ of the numerical control machine tool within the given time period is compared with a preset alarming lower limit value $\eta_{performance\_e}^L$ of the load-energy efficiency of the numerical control machine tool. If the expression $\eta_{performance\_e} > \eta_{performance\_e}^L$ is satisfied, it indicates that the load-energy efficiency of the numerical control machine tool is normal; and if the expression $\eta_{performance\_e} \leq \eta_{performance\_e}^L$ is satisfied, it is prompted by alarming that the load-energy efficiency of the numerical control machine tool is abnormal, and the load-energy efficiency of the numerical control machine tool, the corresponding loading performance of the numerical control machine tool and the corresponding waste energy value of the numerical control machine tool within the evaluation period are displayed on a display screen at the same time.

At step 10, according to the alarming prompt at step 9, production personnel make specific adjustment to the part processing procedure of the numerical control machine tool to reduce the waste energy value of the numerical control machine tool so as to increase the load-energy efficiency of the numerical control machine tool to a normal range.

At step 2, the available time $T_{available}$ of the numerical control machine tool within the given time period is obtained by subtracting a downtime of the numerical control machine tool from a planned processing time of the numerical control machine tool within the given time period based on the following calculation model:

$$T_{available} = T_{planed} - T_{downtime}.$$

In the above model, $T_{available}$ refers to the available time of the numerical control machine tool within the given time period, $T_{planed}$ refers to the planned processing time of the numerical control machine tool within the given time period, and $T_{downtime}$ refers to the downtime of the numerical control machine tool within the given time period.

At step 5, the waste time $T_{waste}$ of the numerical control machine tool within the given time period is obtained by subtracting an overall ideal part processing time from the available time of the numerical control machine tool within the given time period based on the following calculation model:

$$T_{waste} = T_{available} - O_{actual} \times T_{ideal\text{-}CT}.$$

In the above model, $T_{waste}$ refers to the waste time of the numerical control machine tool within the given time period, $T_{available}$ refers to the available time of the numerical control machine tool within the given time period, $O_{actual}$ refers to the actual part processing number of the numerical control machine tool within the given time period, and $T_{ideal\text{-}CT}$ refers to the single-part ideal processing time.

At step 5, the standby power value $P_{standby}$ of the numerical control machine tool is obtained by measuring the power value of the numerical control machine tool in a standby state several times using a power measuring device mounted at the air switch of the numerical control machine tool and performing averaging for the obtained power values.

Compared with the prior art, the present disclosure has the following beneficial effects.

In the method of the present disclosure, the relationship model between the load-energy efficiency of the numerical control machine tool and the loading performance of the numerical control machine tool is built in comprehensive consideration of the impact of the rate loss of the numerical control machine tool on the loading performance of the numerical control machine tool and in further consideration of the impact of the loading performance of the numerical control machine tool on the energy efficiency of the numerical control machine tool. Further, the load-energy efficiency of the numerical control machine tool is monitored to realize the over-limit alarming of the load-energy efficiency of the numerical control machine tool. The method of the present disclosure can effectively and accurately evaluate the load-energy efficiency of the numerical control machine tool in the manufacturing industry in consideration of the impact of the rate loss of the numerical control machine tool on the energy efficiency of the numerical control machine tool. The method of the present disclosure can specifically evaluate the load-energy efficiency of the numerical control machine tool in the manufacturing industry and perform the over-limit alarming for the load-energy efficiency of the numerical control machine tool, and thus the method is an effective and practical method of evaluating and monitoring the load-energy efficiency of the numerical control machine tool. The method of the present disclosure is scientific and practical, and may be promoted to load-energy efficiency evaluation and monitoring of other mechanical equipment, for example, a conveyor.

BRIEF DESCRIPTIONS OF THE DRAWINGS

DETAILED DESCRIPTIONS OF EMBODIMENTS

The present disclosure is described in detail now in combination with examples and accompanying drawings.

Figure 1:
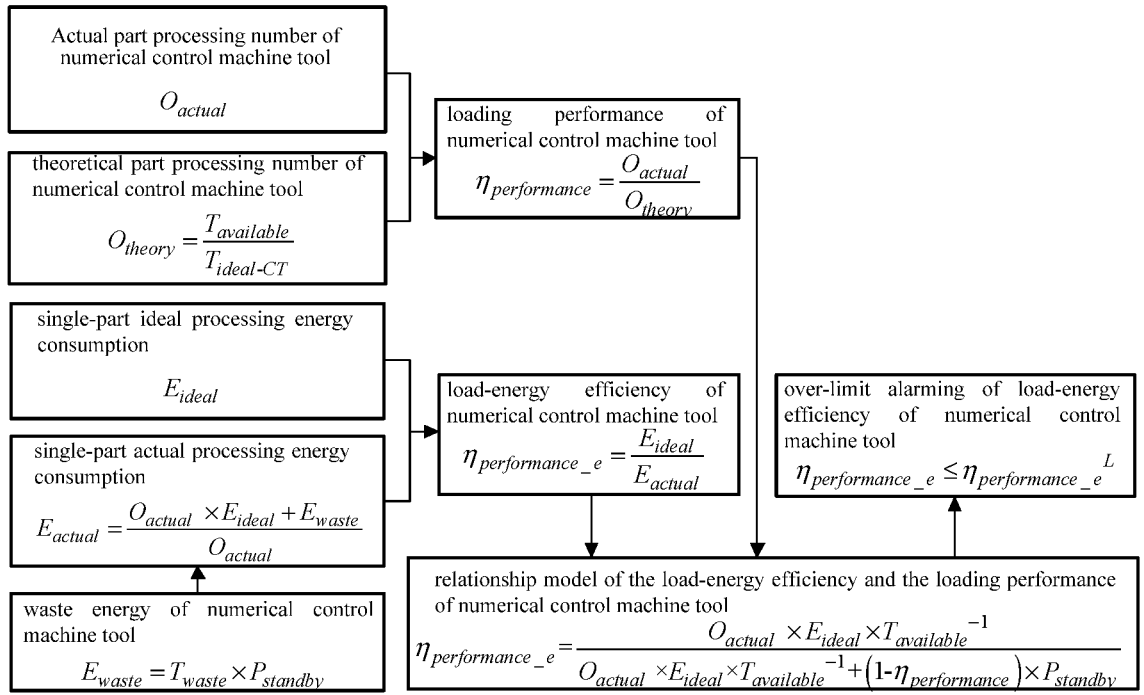
FIG. 1 is a flowchart of a method according to an example of the present disclosure.

The present disclosure provides a load-energy efficiency evaluation and monitoring method for achieving energy conservation and emission reduction of a numerical control machine tool. A flowchart of the method according to the present disclosure is as shown in FIG. 1. Firstly, an actual part processing number of the numerical control machine tool within a given time period is obtained through perception by means of an RFID tag and an RFID reader attached to parts. Next, a theoretical part processing number of the numerical control machine tool is calculated according to an available time of the numerical control machine tool within the given time period and a single-part ideal processing time. A loading performance of the numerical control machine tool is calculated based on the obtained actual part processing number of the numerical control machine tool and the obtained theoretical part processing number of the numerical control machine tool. A single-part ideal processing energy consumption value is obtained by measuring a single-part processing energy consumption value of the numerical control machine tool under ideal processing parameters several times and performing averaging for the obtained energy consumption values. An waste energy value of the numerical control machine tool within the given time period is calculated based on a waste time of the numerical control machine tool within the given time period and a standby power value of the numerical control machine tool. Further, the single-part actual processing energy consumption value is obtained according to the obtained waste energy value of the numerical control machine tool within the given time period in combination with the actual part processing number of the numerical control machine tool within the given time period. The load-energy efficiency of the numerical control machine tool is calculated according to the obtained single-part ideal processing energy consumption value and the obtained single-part actual processing energy consumption value. A relationship model between the load-energy efficiency of the numerical control machine tool and the loading performance of the numerical control machine tool is built based on the built model of the loading performance of the numerical control machine tool and the built model of the load-energy efficiency of the numerical control machine tool. The load-energy efficiency of the numerical control machine tool is monitored based on the above relationship model to realize an over-limit alarming function, so as to control the load-energy efficiency of the numerical control machine tool within a required range.

Figure 2:
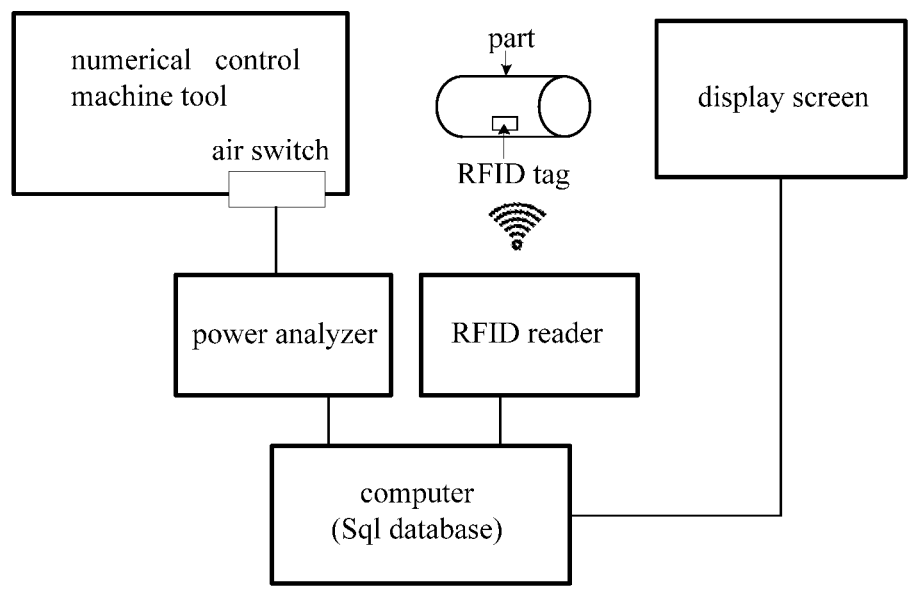
FIG. 2 is a schematic diagram of a device configuration of a method according to an example of the present disclosure.

As shown in FIG. 2, a device configuration involved in the present disclosure mainly includes: a power analyzer, an RFID tag, an RFID reader, a computer installed with Sql database and a display screen. The power analyzer is used to measure the standby power of the numerical control machine tool and the part-processing energy consumption of the numerical control machine tool; the RFID tag is attached to the part for part identification; the RFID reader obtains a part processing number by perceiving the RFID tag; the computer installed with the Sql database is configured to store the collected part processing number of the numerical control machine tool, and the collected power, energy consumption and energy efficiency of the numerical control machine tool; the display screen is connected with the computer to display the load-energy efficiency, the loading performance and the waste energy of the numerical control machine tool.

In an example of the present disclosure, a numerical control machine tool CK6153i is taken as an example with the processed parts being cylindrical parts for wholesales and retails. The method of the present disclosure is adopted to evaluate and monitor the load-energy efficiency of the numerical control machine tool and perform over-limit alarming for the load-energy efficiency of the numerical control machine tool.

1. The actual part processing number of the numerical control machine tool is obtained.

The load-energy efficiency of the numerical control machine tool is evaluated every other one hour, and thus the given time period is one hour. An initial value of the actual part processing number of the numerical control machine tool is set to 0 ($O_{actual}=0$). The RFID tag is attached to each part. After being processed on the numerical control machine tool, the part will pass through the RFID reader, and the RFID reader can automatically perceive the passing RFID tag and automatically accumulate 1 to the actual part processing number of the numerical control machine tool ($O_{actual}=O_{actual}+1$). July 28th 9:00 to 10:00 AM is taken as an example. The numerical control machine tool CK6153i totally processes 24 parts, and the RFID perceives 24 RFID tags and obtains the actual part processing number of the numerical control machine tool, that is, $O_{actual}$=24 pieces.

2. The theoretical part processing number of the numerical control machine tool is obtained.

Since the load-energy efficiency of the numerical control machine tool is evaluated every other one hour, it is required to obtain the theoretical part processing number of the numerical control machine tool within one hour.

July 28th 9:00 to 10:00 AM is still taken as an example. The planned processing time of the numerical control machine tool within the time period is 60 minutes ($T_{planed}$=3600 seconds), and the downtime of the numerical control machine tool caused by adjustment is 5 minutes ($T_{downtime}$=300 seconds). In this case, the available time of the numerical control machine tool is calculated in the model $T_{available}=T_{planed}-T_{downtime}$. In the model, $T_{available}$ refers to the available time of the numerical control machine tool, in the unit of second (s); $T_{planed}$ refers to the planned processing time of the numerical control machine tool, in the unit of second (s); $T_{downtime}$ refers to the downtime of the numerical control machine tool, in the unit of second (s). Data of $T_{planed}$=3600 and $T_{downtime}$=300 for July 28th 9:00 to 10:00 AM is substituted into the formula to obtain the available time of the numerical control machine tool within the evaluation period, that is, $T_{available}=T_{planed}-T_{downtime}$=3600−300=3300 seconds. The single-part ideal processing time of this part is obtained according to historical information, that is, $T_{ideal\text{-}CT}$=120 seconds/piece. The theoretical part processing number of the numerical control machine tool is calculated in the model $$O_{theory} = \frac{T_{available}}{T_{ideal-CT}}.$$

In the model, $O_{theory}$ refers to the theoretical part processing number of the numerical control machine tool within the given time period, in the unit of piece; $T_{available}$ refers to the available time of the numerical control machine tool within the given time period, in the unit of second (s); $T_{ideal\text{-}CT}$ refers to the single-part ideal processing time, in the unit of second (s). The obtained available time of the numerical control machine tool within the evaluation period, $T_{available}$=3300 seconds, and the obtained single-part ideal processing time, $T_{idea\text{-}CT}$=120 seconds/piece, are substituted into the formula $$O_{theory} = \frac{T_{available}}{T_{ideal-CT}}$$

to calculate the theoretical part processing number of the numerical control machine tool, $O_{theory}$=27 pieces.

3. The loading performance of the numerical control machine tool is obtained.

The loading performance of the numerical control machine tool is calculated according to the obtained actual part processing number and the obtained theoretical part processing number of the numerical control machine tool within the evaluation period based on the calculation model $$\eta_{performance} = \frac{O_{actual}}{O_{theory}}.$$

In the model, $\eta_{performance}$ refers to the loading performance of the numerical control machine tool, $O_{actual}$ refers to the actual part processing number of the numerical control machine tool within the given time period, in the unit of piece; $O_{theory}$ refers to the theoretical part processing number of the numerical control machine tool within the given time period, in the unit of piece. By still taking July 28th 9:00 to 10:00 AM as an example, the actual part processing number of the numerical control machine tool within the evaluation period is obtained as $O_{actual}$=24 pieces and the theoretical part processing number of the numerical control machine tool within the evaluation period is obtained as $O_{theory}$=27 pieces. The above data is substituted into the formula $$\eta_{performance} = \frac{O_{actual}}{O_{theory}}$$

to calculate the loading performance of the numerical control machine tool, that is, $\eta n_{performance}$=88.9%.

4. The single-part ideal processing energy consumption is obtained.

An energy consumption measuring device is mounted at an air switch of the numerical control machine tool CK6153i. The energy consumption measuring device used in this example is a power analyzer that can record the power and energy consumption during processing of the machine tool at the same time. The single-part processing energy consumption value of the numerical control machine tool under given ideal processing parameters is measured several times. 30 single-part processing energy consumption values under the given ideal processing parameters are obtained as shown in Table 1.

TABLE 1

| | Measurement sequence number | | | | | | |
|---|---|---|---|---|---|---|---|
| | 1 | 2 | 3 | 4 | ... | 29 | 30 |
| Energy consumption value (kJ) | 152.6 | 153.1 | 149.7 | 153.9 | ... | 148.3 | 150.2 |

The single-part ideal processing energy consumption value $E_{ideal}$=151.7 may be obtained by performing averaging for the 30 energy consumption values in Table 1.

5. The waste energy value of the numerical control machine tool is obtained.

The waste energy value of the numerical control machine tool within the given time period is jointly determined by the waste time and the standby power value of the numerical control machine tool. Therefore, it is required to firstly obtain the waste time and the standby power value of the numerical control machine tool.

5.1 The waste time of the numerical control machine tool is obtained.

By still taking July 28th 9:00 to 10:00 AM as an example, the available time of the numerical control machine tool within the evaluation period is obtained as $T_{available}$=3300 seconds, the single-part ideal processing time is obtained as $T_{ideal\text{-}CT}$=120 seconds/piece and the actual part processing number of the numerical control machine tool within the evaluation period is obtained as $O_{actual}$=24 pieces. The waste time $T_{waste}$ of the numerical control machine tool within the given time period is calculated in the model $T_{waste}=T_{available}-O_{actual}\times T_{ideal\text{-}CT}$. In the model, $T_{waste}$ refers to the waste time of the numerical control machine tool within the given time period, in the unit of second (s); $T_{available}$ refers to the available time of the numerical control machine tool within the given time period, in the unit of second (s); $O_{actual}$ refers to the actual part processing number of the numerical control machine tool within the given time period, in the unit of piece; $T_{ideal-CT}$ refers to the single-part ideal processing time, in the unit of second/piece. The obtained $T_{available}$=3300 seconds, $T_{ideal-CT}$=120 seconds/piece and $O_{actual}$=24 pieces are substituted into the above formula to calculate the waste time of the numerical control machine tool within the given time period, that is, $T_{waste}=T_{available}-O_{actual}\times T_{ideal-CT}=3300-24\times120=420$ (s).

5.2 The standby power value of the numerical control machine tool is obtained.

The power measuring device is mounted at the air switch of the numerical control machine tool CK6153i. The power measuring device used in this example is a power analyzer. The numerical control machine tool CK6153i is started and allowed to be in a standby state without any further operations, and 50 standby power values of the machine tool are measured as shown in Table 2.

TABLE 2

| | Measurement sequence number | | | | | | |
|---|---|---|---|---|---|---|---|
| | 1 | 2 | 3 | 4 | ... | 49 | 50 |
| Standby power value (kW) | 0.31 | 0.32 | 0.31 | 0.32 | ... | 0.30 | 0.33 |

The standby power value $P_{standby}$=0.32 (kW) of the numerical control machine tool, that is, is obtained by performing averaging for the 50 standby power values of the machine tool in Table 2.

The waste energy value of the numerical control machine tool within the given time period is calculated in the model $E_{waste}=T_{waste}\times P_{standby}$. In the model, $E_{waste}$ refers to the waste energy value of the numerical control machine tool within the given time period, in the unit of kilojoule (kJ); $T_{waste}$ refers to the waste time of the numerical control machine tool within the given time period, in the unit of second (s); $P_{standby}$ refers to the standby power value of the numerical control machine tool, in the unit of kilowatt (kW). The obtained $T_{waste}$=420 seconds and $P_{standby}$=0.32 kW are substituted into the above formula to calculate the waste energy value of the numerical control machine tool, that is, $E_{waste}$=420×0.32=134.4 (kJ).

6. The single-part actual processing energy consumption is obtained.

By still taking July 28th 9:00 to 10:00 AM as an example, the waste energy value of the numerical control machine tool is obtained as $E_{waste}$=134.4 kJ, the actual part processing number of the numerical control machine tool within the given time period is obtained as $O_{actual}$=24 pieces, and the single-part ideal processing energy consumption value is obtained as $E_{ideal}$=151.7 kJ. Thus, the single-part actual processing energy consumption value is calculated in the formula $$E_{actual}=\frac{O_{actual}\times E_{ideal}+E_{waste}}{O_{actual}}.$$

In the formula, $E_{actual}$ refers to the single-part actual processing energy consumption value, in the unit of kilojoule (KJ); $O_{actual}$ refers to the actual part processing number of the numerical control machine tool within the given time period, in the unit of piece; $E_{ideal}$ refers to the single-part ideal processing energy consumption value, in the unit of kilojoule (KJ); $E_{waste}$ refers to the waste energy value of the numerical control machine tool within the given time period, in the unit of kilojoule (KJ). The obtained $E_{waste}$=134.4 kJ, $O_{actual}$=24 pieces and $E_{ideal}$=151.7 kJ are substituted into the above formula to calculate the single-part actual processing energy consumption value within the given time period, that is, $$E_{actual}=\frac{O_{actual}\times E_{ideal}+E_{waste}}{O_{actual}}=\frac{24\times 151.7+134.4}{24}=157.3 \text{ (kJ)}.$$

7. The load-energy efficiency of the numerical control machine tool is obtained.

The load-energy efficiency of the numerical control machine tool is calculated according to the obtained single-part ideal processing energy consumption and the obtained single-part actual processing energy consumption of the numerical control machine tool based on the calculation formula $$\eta_{performance\_e}=\frac{E_{ideal}}{E_{actual}}.$$

In the formula, $\eta_{performance\_e}$ refers to the load-energy efficiency of the numerical control machine tool; $E_{ideal}$ refers to the single-part ideal processing energy consumption value, in the unit of kilojoule (KJ); $E_{actual}$ refers to the single-part actual processing energy consumption value, in the unit of kilojoule (KJ). By still taking July 28th 9:00 to 10:00 AM as an example, the single-part ideal processing energy consumption value within the period is obtained as $E_{ideal}$=151.7 kJ, and the single-part actual processing energy consumption value within the period is obtained as $E_{actual}$=157.3 kJ. The above data is substituted into the formula $$\eta_{performance\_e}=\frac{E_{ideal}}{E_{actual}}$$

to calculate the load-energy efficiency of the numerical control machine tool within the period, that is, $$\eta_{performance\_e}=\frac{151.7}{157.3}=96.4\%.$$

8. The relationship model between the load-energy efficiency and the loading performance of the numerical control machine tool is obtained.

The relationship model between the load-energy efficiency of the numerical control machine tool and the loading performance of the numerical control machine tool is obtained through derivation operation according to the built calculation model of the loading performance of the numerical control machine tool and the built calculation model of the load-energy efficiency of the numerical control machine tool, and the relationship model is expressed as $$\eta_{performance\_e} = \frac{O_{actual} \times E_{ideal} \times T_{available}^{-1}}{O_{actual} \times E_{ideal} \times T_{available}^{-1} + (1 - \eta_{performance}) \times P_{standby}}.$$

In the formula, $\eta_{performance\_e}$ refers to the load-energy efficiency of the numerical control machine tool; $O_{actual}$ refers to the actual part processing number of the numerical control machine tool within the given time period, in the unit of piece; $E_{ideal}$ refers to the single-part ideal processing energy consumption value, in the unit of kilojoule (KJ); $T_{available}$ refers to the available time of the numerical control machine tool within the given time period, in the unit of second (s); $\eta_{performance}$ refers to the loading performance of the numerical control machine tool; $P_{standby}$ refers to the standby power value of the numerical control machine tool, in the unit of kilowatt (kW). By still taking July 28th 9:00 to 10:00 AM as an example, the actual part processing number of the numerical control machine tool within the period is obtained as $O_{actual}$=24 pieces, the single-part ideal processing energy consumption value is obtained as $E_{ideal}$=151.7 kJ, the available time of the numerical control machine tool is obtained as $T_{available}$=3300 s, and the standby power value of the numerical control machine tool is obtained as $P_{standby}$=0.32 kW. The above data is substituted into the relationship model between the load-energy efficiency of the numerical control machine tool and the loading performance of the numerical control machine tool to further express as follows:

$$\eta_{performance\_e} = \frac{1.1}{142 - 0.32 \times \eta_{performance}}.$$

9. Monitoring and over-limit alarming are performed for the load-energy efficiency of the numerical control machine tool.

The obtained load-energy efficiency $\eta_{performance\_e}$ of the numerical control machine tool within the evaluation period is compared with a preset alarming lower limit value $\eta_{performance\_e}^{L}$ of the load-energy efficiency of the numerical control machine tool. In the present disclosure, the alarming lower limit value $\eta_{performance\_e}^{L}$ of the load-energy efficiency of the numerical control machine tool is determined according to statistical analysis of historical data of the load-energy efficiency of the numerical control machine tool in combination with experiences of managers. By still taking July 28th 9:00 to 10:00 AM as an example, if the alarming lower limit value of the load-energy efficiency of the numerical control machine tool in this example is $\eta_{performance\_e}^{L}$=95% and the load-energy efficiency of the numerical control machine tool within the evaluation period is obtained as $\eta_{performance\_e}^{L}$=96.4%, the expression 96.4%=$\eta_{performance\_e}$>$\eta_{performance\_e}^{L}$=95% is satisfied, which indicates that the load-energy efficiency of the numerical control machine tool is normal. Based on the above example, if the alarming lower limit value of the load-energy efficiency of the numerical control machine tool is $\eta_{performance\_e}^{L}$=97%, the expression 96.4%=$\eta_{performance\_e}$≤$\eta_{performance\_e}^{L}$=97% is satisfied; at this time, it is prompted by alarming that the load-energy efficiency of the numerical control machine tool is abnormal and lower than the lower limit of the load-energy efficiency of the numerical control machine tool, and the load-energy efficiency ($\eta_{performance\_e}$=96.4%) of the numerical control machine tool within the evaluation period, the corresponding loading performance ($\eta_{performance}$=88.9%) of the numerical control machine tool within the evaluation period and the waste energy value ($E_{waste}$=134.4 kJ) of the numerical control machine tool within the evaluation period are all displayed on the display screen at the same time.

10. Parameters of the numerical control machine tool are adjusted according to the alarming prompt to increase the load-energy efficiency to the normal range.

Machine tool operator makes specific adjustment to the processing parameters of the numerical control machine tool according to the alarming prompt at step 9, so as to increase the load-energy efficiency of the numerical control machine tool to the normal range.

The method of the present disclosure may be used in scientific evaluation and monitoring of the load-energy efficiency of the numerical control machine tool in the manufacturing industry to control the load-energy efficiency of the numerical control machine tool within the required range and realize high-efficiency and energy-saving operations of the numerical control machine tool. The method of the present disclosure provides an effective method and a technical support for realizing energy conservation and emission reduction in the manufacturing industry.

It is finally to be noted that the above examples are only intended to describe the technical solutions of the present disclosure rather than limit the technical solutions of the present disclosure. Modifications or equivalent substitutions made to the technical solutions of present disclosure without departing from the spirit and scope of the present disclosure shall all be encompassed in the scope of claims of the present disclosure.

What is claimed is:

1. A load-energy efficiency evaluation and monitoring method for achieving energy conservation and emission reduction of a numerical control machine tool, comprising the following steps:

at step 1, processing parts by a numerical control machine tool within a given time period, wherein each part is provided with a radio frequency identification (RFID) tag, and after processing a part, automatically perceiving, by an RFID reader, the processed part and automatically increasing a tally of the quantity of processed parts by 1 each time a part is processed to obtain an actual part processing number, denoted as $O_{actual}$, of the numerical control machine tool within a given time period;

at step 2, calculating a theoretical part processing number of the numerical control machine tool based on an available time of the numerical control machine tool within the given time period and a single-part ideal part processing time, wherein the calculation of the theoretical part processing number uses a theoretical part processing model as follows:

$$O_{theory} = \frac{T_{available}}{T_{ideal-CT}};$$

wherein, $O_{theory}$ refers to the theoretical part processing number of the numerical control machine tool within the given time period, $T_{available}$ refers to the available time of the numerical control machine tool within the given time period, and $T_{ideal-CT}$ refers to the single-part ideal processing time;

at step 3, calculating a loading performance of the numerical control machine tool based on the obtained actual part processing number of the numerical control machine tool within the given time period and the obtained theoretical part processing number of the numerical control machine tool within the given time period, wherein the calculation of the load performing of the numerical control machine tool uses a load performance model thereof as follows:

$$\eta_{performance} = \frac{O_{actual}}{O_{theory}};$$

wherein, $\eta_{performance}$ refers to the loading performance of the numerical control machine tool, $O_{actual}$ refers to the actual part processing number of the numerical control machine tool within the given time period, and $O_{theory}$ refers to the theoretical part processing number of the numerical control machine tool within the given time period;

at step 4, measuring a single-part processing energy consumption value of the numerical control machine tool under given ideal processing parameters several times by using an energy consumption measuring device mounted at an air switch of the numerical control machine tool and performing averaging for the obtained energy consumption values, so as to obtain a single-part ideal processing energy consumption value denoted as $E_{ideal}$;

at step 5, calculating a waste energy value of the numerical control machine tool within the given time period based on a waste time of the numerical control machine tool within the given time period and a standby power value of the numerical control machine tool, wherein the waste energy value of the numerical control machine tool within the given time period uses a waste energy value model as follows:

$$E_{waste} = T_{waste} \times P_{standby};$$

wherein, $E_{waste}$ refers to the waste energy value of the numerical control machine tool within the given time period, $T_{waste}$ refers to the waste time of the numerical control machine tool within the given time period, and $P_{standby}$ refers to the standby power value of the numerical control machine tool;

at step 6, obtaining a single-part actual processing energy consumption value according to the obtained waste energy value of the numerical control machine tool within the given time period in combination with the actual part processing number of the numerical control machine tool within the given time period, wherein the single-part processing energy consumption value is obtained using a model as follows:

$$E_{actual} = \frac{O_{actual} \times E_{ideal} + E_{waste}}{O_{actual}};$$

wherein, $E_{actual}$ refers to the single-part actual processing energy consumption value, $O_{actual}$ refers to the actual part processing number of the numerical control machine tool within the given time period, $E_{ideal}$ refers to the single-part ideal processing energy consumption value, and $E_{waste}$ refers to the waste energy value of the numerical control machine tool within the given time period;

at step 7, calculating a load-energy efficiency of the numerical control machine tool based on the obtained single-part ideal processing energy consumption value and the single-part actual processing energy consumption value, wherein the load-energy efficiency of the numerical control machine tool uses a load-energy efficiency model as follows:

$$\eta_{performance\_e} = \frac{E_{ideal}}{E_{actual}};$$

wherein, $\eta_{performance\_e}$ refers to the load-energy efficiency of the numerical control machine tool, $E_{ideal}$ refers to the single-part ideal processing energy consumption value, and $E_{actual}$ refers to the single-part actual processing energy consumption value;

at step 8, obtaining a relationship model between the load-energy efficiency of the numerical control machine tool and the loading performance of the numerical control machine tool through derivation operation based on the obtained calculation model of the loading performance of the numerical control machine tool and the obtained calculation model of the load-energy efficiency of the numerical control machine tool, wherein the relationship model is expressed as follows:

$$\eta_{performance\_e} = \frac{O_{actual} \times E_{ideal} \times T_{available}^{-1}}{O_{actual} \times E_{ideal} \times T_{available}^{-1} + (1 - \eta_{performance}) \times P_{standby}};$$

in the above formula, $\eta_{performance\_e}$ refers to the load-energy efficiency of the numerical control machine tool, $O_{actual}$ refers to the actual part processing number of the numerical control machine tool within the given time period, $E_{ideal}$ refers to the single-part ideal processing energy consumption value, $T_{available}$ refers to the available time of the numerical control machine tool within the given time period, $\eta_{performance}$ refers to the loading performance of the numerical control machine tool, and $P_{standby}$ refers to the standby power value of the numerical control machine tool;

at step 9, comparing the obtained load-energy efficiency $\eta_{performance\_e}$ of the numerical control machine tool within the given time period with a preset alarming lower limit value $\eta_{performance\_e}^{L}$ of the load-energy efficiency of the numerical control machine tool; if the expression $\eta_{performance\_e} > \eta_{performance\_e}^{L}$ is satisfied, the load-energy efficiency of the numerical control machine tool being normal; if the expression $\eta_{performance\_e} \leq \eta_{performance\_e}^{L}$ is satisfied, prompting by alarming that the load-energy efficiency of the numerical control machine tool is abnormal, and displaying the load-energy efficiency of the numerical control machine tool, the corresponding loading performance of the numerical control machine tool and the waste energy value of the numerical control machine tool within the given time period on a display screen at the same time;

at step 10, according to the alarming prompt at step 9, making, by production personnel, specific adjustment to a part processing procedure of the numerical control machine tool to reduce the waste energy value of the numerical control machine tool so as to increase the load-energy efficiency of the numerical control machine tool to a normal range.

2. The load-energy efficiency evaluation and monitoring method according to claim 1, wherein at step 2, the available time $T_{available}$ of the numerical control machine tool within the given time period is obtained by subtracting a downtime of the numerical control machine tool within the given time period from a planned processing time within the given time period based on the calculation model as follows:

$$T_{available} = T_{planed} - T_{downtime};$$

in the above model, $T_{available}$ refers to the available time of the numerical control machine tool within the given time period, $T_{planed}$ refers to the planned processing time of the numerical control machine tool within the given time period, and $T_{downtime}$ refers to the downtime of the numerical control machine tool within the given time period.

3. The load-energy efficiency evaluation and monitoring method according to claim 1, wherein at step 5, the waste time $T_{waste}$ of the numerical control machine tool within the given time period is obtained by subtracting an overall ideal part processing time from the available time of the numerical control machine tool within the given time period based on the calculation model as follows:

$$T_{waste} = T_{available} - O_{actual} \times T_{ideal\text{-}CT};$$

in the above model, $T_{waste}$ refers to the waste time of the numerical control machine tool within the given time period, $T_{available}$ refers to the available time of the numerical control machine tool within the given time period, $O_{actual}$ refers to the actual part processing number of the numerical control machine tool within the given time period, and $T_{ideal\text{-}CT}$ refers to the single-part ideal processing time.

4. The load-energy efficiency evaluation and monitoring method according to claim 1, wherein at step 5, the standby power value $P_{standby}$ of the numerical control machine tool is obtained by measuring the power value of the numerical control machine tool in a standby state several times using a power measuring device mounted at the air switch of the numerical control machine tool and performing averaging for the obtained power values.

* * * * *